(12) United States Patent
Deshayes et al.

(10) Patent No.: US 10,478,013 B2
(45) Date of Patent: Nov. 19, 2019

(54) COOKING APPLIANCE COMPRISING A LID EQUIPPED WITH A TUBE FOR ADDING FOOD

(71) Applicant: SEB S.A., Ecully (FR)

(72) Inventors: Jean-Louis Deshayes, Averton (FR); Jean-Yves Beaudet, Haleine (FR)

(73) Assignee: SEB S.A., Ecully (FR)

( * ) Notice: Subject to any disclaimer, the term of this patent is extended or adjusted under 35 U.S.C. 154(b) by 226 days.

(21) Appl. No.: 15/086,165

(22) Filed: Mar. 31, 2016

(65) Prior Publication Data

US 2016/0287011 A1   Oct. 6, 2016

(30) Foreign Application Priority Data

Apr. 1, 2015  (FR) ..................... 15 52820

(51) Int. Cl.
| | |
|---|---|
| *A47J 36/06* | (2006.01) |
| *A47J 43/046* | (2006.01) |
| *A47J 43/07* | (2006.01) |
| *A47J 27/00* | (2006.01) |
| *B26D 1/29* | (2006.01) |

(52) U.S. Cl.
CPC ............ *A47J 36/06* (2013.01); *A47J 27/004* (2013.01); *A47J 43/046* (2013.01); *A47J 43/0716* (2013.01); *A47J 43/0772* (2013.01); *B26D 1/29* (2013.01)

(58) Field of Classification Search
CPC .... A47J 36/06; A47J 43/0716; A47J 43/0722; A47J 27/004; A47J 43/046; B26D 1/29; B01F 7/0045; B01F 7/00458; B01F 7/16; B01F 7/18; B01F 7/26

USPC .............. 99/353; 241/37.5, 166, 273.1, 277, 241/282.1, 282.2

See application file for complete search history.

(56) References Cited

U.S. PATENT DOCUMENTS

| | | | | |
|---|---|---|---|---|
| 4,113,188 | A | * | 9/1978 | Belinkoff ................ A47J 43/06 241/282.1 |
| 4,600,155 | A | | 7/1986 | Bos et al. |
| 2004/0045445 | A1 | * | 3/2004 | Tompa ................ A47J 43/0716 99/348 |
| 2008/0061174 | A1 | * | 3/2008 | Comstock ........... A47J 43/0772 241/101.2 |
| 2011/0174905 | A1 | * | 7/2011 | Chan .................... A47J 43/0716 241/37.5 |

(Continued)

FOREIGN PATENT DOCUMENTS

| | | |
|---|---|---|
| FR | 0076712 A1 | 8/1982 |
| FR | 2559337 A3 | 8/1985 |
| FR | 2769197 A1 | 4/1999 |

(Continued)

*Primary Examiner* — Tu B Hoang
*Assistant Examiner* — Erin E McGrath
(74) *Attorney, Agent, or Firm* — The Webb Law Firm

(57) ABSTRACT

Cooking appliance including a lid that closes, in a removable manner, a working container receiving a tool spun by a motor, the lid having a body equipped with a tube for adding food, arranged in an off-center manner on the lid, wherein the lid includes a locking ring that can move by spinning on said body, and the locking ring can be in a closed position in which locking components hold the lid in a closed position on the working container, and in an open position in which the lid can be lifted off of the working container.

11 Claims, 6 Drawing Sheets

(56) References Cited

U.S. PATENT DOCUMENTS

2013/0206771 A1* 8/2013 Arnold .................... A47J 36/10
220/315

FOREIGN PATENT DOCUMENTS

FR          2939298 A1    6/2010
WO      2014/096665 A1    6/2014

* cited by examiner

COOKING APPLIANCE COMPRISING A LID EQUIPPED WITH A TUBE FOR ADDING FOOD

CROSS-REFERENCE TO RELATED APPLICATION

This application claims priority to French Patent Application No. 1552820 filed Apr. 1, 2015, the disclosure of which is hereby incorporated in its entirety by reference.

FIELD OF THE INVENTION

This invention pertains to the general technical field of cooking appliances comprising a lid that closes, in a removable manner, a working container receiving a tool spun by a motor, and pertains more specifically to an appliance in which the lid has a body equipped with a tube for adding food, arranged off-center on the lid.

DESCRIPTION OF RELATED ART

There exists, in patent application FR 2 769 197, a cooking appliance comprising a lid that closes, in a removable manner, a working container receiving a tool spun by a motor, the lid having a tube for adding food, arranged off-center on the lid. In this document, the lid offers the advantage of being able to be arranged in any orientation on the working container, such that the tube can be arranged in the position most suitable for the user.

However, such an appliance presents the disadvantage of having a mechanism for locking the lid onto the working container that is relatively complex, cumbersome and costly to produce.

SUMMARY OF THE INVENTION

Consequently, one purpose of this invention is to remedy these disadvantages by proposing a cooking appliance comprising a lid with a tube for adding food, in which the tube can be arranged in any orientation, that is simple and inexpensive to produce.

To this end, the invention pertains to a cooking appliance comprising a lid that closes, in a removable manner, a working container receiving a tool spun by a motor, the lid having a body equipped with a tube for adding food, arranged off-center on the lid, characterized in that the lid comprises a locking ring that can move by spinning on the body, and the locking ring can be in a closed position in which locking components hold the lid in a closed position on the working container, and an open position in which the lid can be lifted off of the working container.

Such an appliance offers the advantage of having a lid in which the tube can be freely oriented with respect to the locking ring, such that the tube can be arranged on the working container in the position most suitable for the user. Moreover, such a lid offers the advantage of having a locking system that is simple, reliable and inexpensive to produce, while achieving very good usage ergonomics.

In another characteristic of the invention, the body of the lid comprises an airtight gasket, preferably removable, that presses against the working container when the lid is in the closed position.

Such a characteristic makes it possible to obtain an airtight seal and thus prevent ingredients or steam from escaping through a resulting gap between the lid and the working container.

In another characteristic of the invention, the body of the lid comprises an interior skirt extending beneath the lid, the interior skirt supporting the airtight gasket.

In another characteristic of the invention, the airtight gasket is a lip seal.

In another characteristic of the invention, the tube rises from the bottom of a cavity arranged in an upper surface of the body of the lid.

Such a characteristic makes it possible to collect, in the cavity, any liquid that might spill over through the tube, or that might be formed by condensation, and thus prevent the liquid from running along the side walls of the container and then seeping into the casing of the appliance, causing a risk of damage to the appliance.

In another characteristic of the invention, the cavity comprises openings leading to the lower surface of the lid.

Such a characteristic makes it possible to return the liquid collected in the cavity to the inside of the working container.

In another characteristic of the invention, the appliance comprises a heating mechanism making it possible to heat the contents of the working container.

Such a characteristic makes it possible to obtain an appliance that cooks food.

In another characteristic of the invention, the lid comprises two handles arranged symmetrically on the locking ring.

Such a characteristic makes for good ergonomics in the handling of the lid.

In another characteristic of the invention, the two handles protrude radially from the edge of the lid.

In another characteristic of the invention, the appliance comprises a drive hub with a lower end that mates, in a removable manner, with a driver arranged in the bottom of the working container and an upper end supporting a vegetable slicing disc, the body of the lid comprising a waste prevention ring that comes to the edge of the vegetable slicing disc when the lid is in the closed position.

In another characteristic of the invention, the body of the lid comprises an annular radial rib that is sandwiched between one annular edge of the locking ring and attachment flanges attached to the locking ring.

In another characteristic of the invention, the locking components consist of tabs carried by the locking ring, which create a bayonet-type connection with the working container.

In another characteristic of the invention, the lid comprises a mechanism to prevent the body of the lid from spinning with respect to the locking ring in the direction in which the tool spins when the lid is locked onto the working container.

BRIEF DESCRIPTION OF THE DRAWINGS

The purposes, aspects and advantages of this invention will be better understood through the description provided below of one particular method of implementing the invention, which is presented as a non-limiting example, in reference to the attached drawings, in which.

DETAILED DESCRIPTION OF THE INVENTION

Figure 1A:
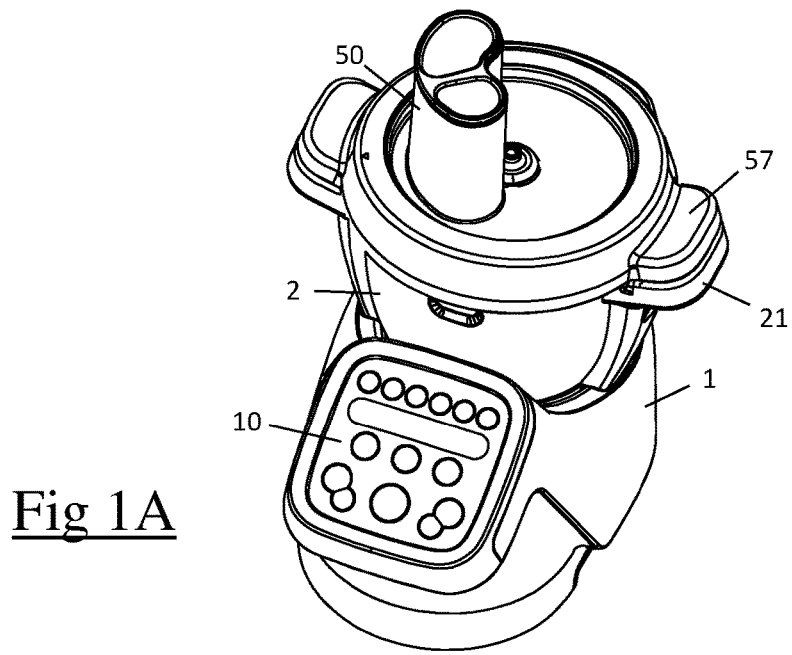
FIGS. 1A and 1B are perspective views of a cooking appliance in one particular method of implementing the invention, the tube of the lid being depicted in two different positions in these two views.

Only the components necessary to understand the invention were depicted. To make it easier to read the drawings, the same components bear the same reference numbers from one figure to another.

FIGS. 1A, 1B, 2 and 3 depict a cooking appliance comprising a casing (1) and a working container (2) resting in a removable manner on the casing (1). The casing (1) encloses an electrical motor (3), depicted in the diagram in FIG. 3, that spins a tool (4) in the working container (2), and comprises a front surface equipped with a control panel (10) that controls the operation of the motor (3).

Preferably, the casing (1) is equipped with a hot plate (11) that can heat the contents of the working container (2), the hot plate (11) and the motor (3) being controlled by an electronic card arranged beneath the control panel (10). In a conventional manner, the electronic card receives the temperature value measured by a temperature sensor and regulates the power supply to the hot plate (11) so as to bring the contents of the working container (2) to a set temperature.

The working container (2) comprises an upper end that is closed by a removable lid (5) with a tube (50) for adding food, and the appliance is advantageously equipped with a lid safety device, not depicted in the drawings, that stops the operation of the motor (3) when the lid (5) is not locked onto the working container (2).

Figure 2:
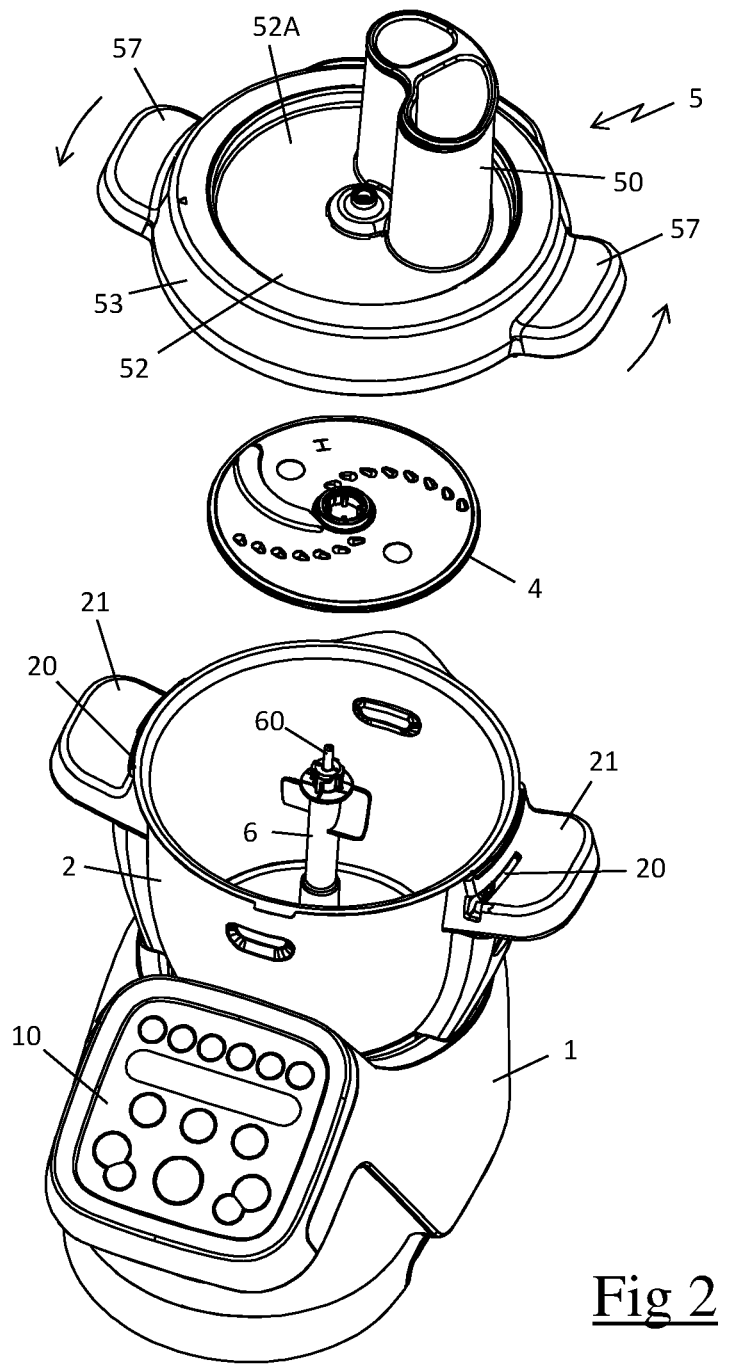
FIG. 2 is an exploded perspective view of the appliance in FIG. 1 with the lid and the vegetable slicing tool removed from the working container.
Figure 3:
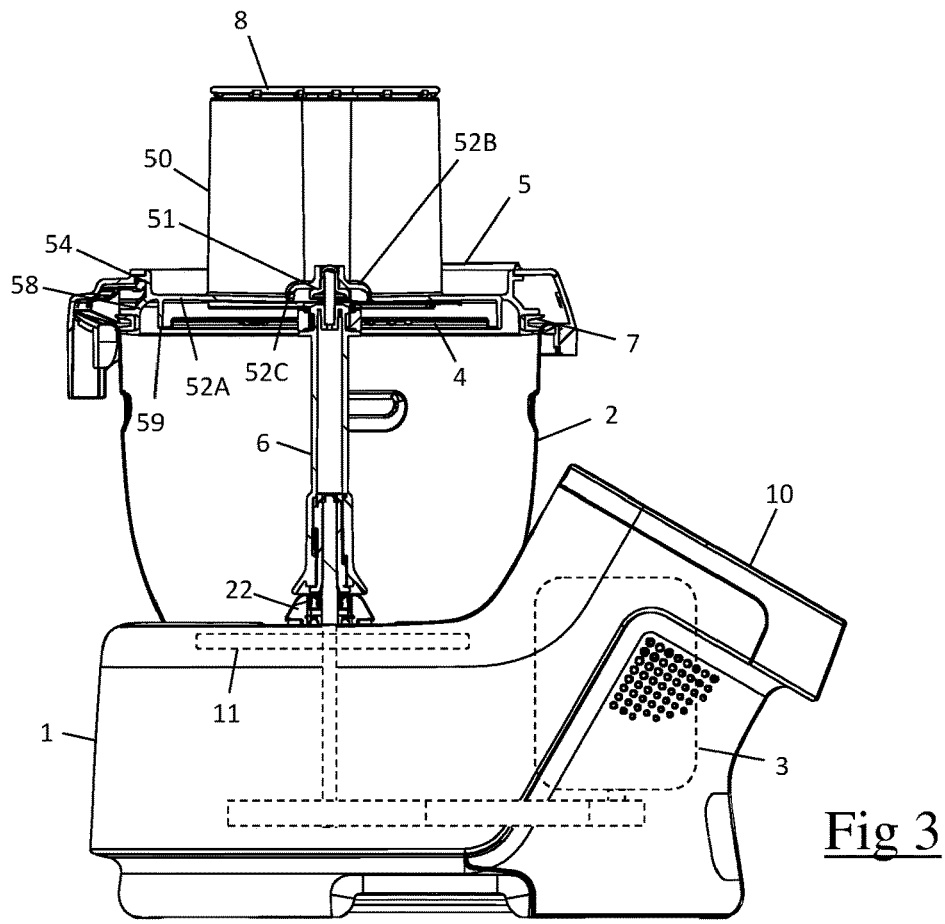
FIG. 3 is a partial longitudinal cross-section view of the appliance in FIG. 1B.
Figure 4:
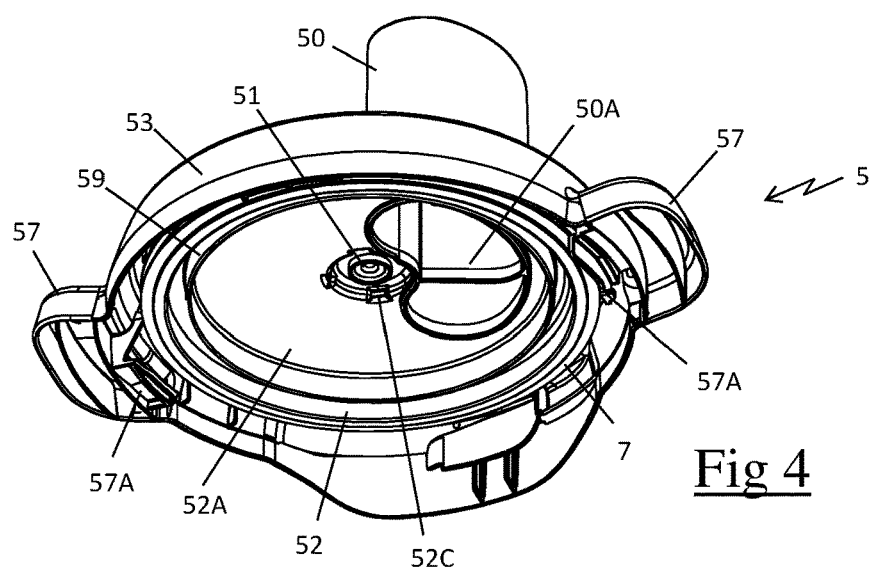
FIG. 4 is a perspective view of the lid of the appliance in FIG. 1B.

As can be seen in FIG. 3, the working container (2) comprises a bottom equipped with a driver (22) driven by the motor (3), and the appliance comprises a drive hub (6) with one lower end that mates, in a removable manner, with the driver (22), and one upper end onto which the tool (4) is mated, in a removable manner, said tool consisting, in the example shown in FIG. 2, of a reversible disc comprising a surface that slices food and an opposite surface that grates food.

The drive hub (6) is advantageously made of a heat-resistant plastic, such as glass fiber-reinforced polyamide or glass fiber-reinforced polypropylene, and advantageously comprises one upper end equipped with a metal axle (60) that is inserted into a guide bearing (51) supported by the lid (5), when the lid (5) closes the working container (2).

As can be seen in FIGS. 4 through 7, the lid (5) preferably comprises a central body (52) made of plastic, of the polyamide or polypropylene kind, in which the tube (50) for adding food is built into the molding, and has a peripheral locking ring (53), which is mounted such that it can move by spinning on the body (52) of the lid (5). To this end, the central body (52) has a cylindrical wall (54) comprising a circular upper edge (54A) that guides the locking ring (53) in its spinning motion by being inserted into a central opening of the locking ring (53) of a complementary diameter, the cylindrical wall (54) supporting an annular radial rib (55) that is sandwiched between one annular edge (53A) of the locking ring (53), surrounding the central opening, and attachment flanges (56) attached beneath the locking ring (53).

Figure 1B:
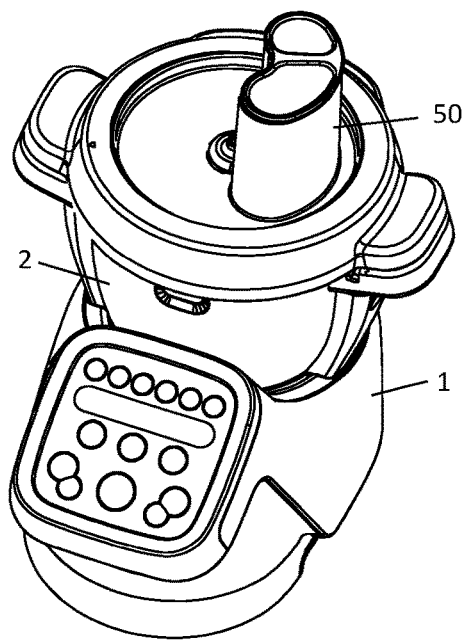

The assembly thus achieved allows the locking ring (53) to spin freely over 360° on the body (52), the locking ring (53) having two locking tabs (57A) arranged opposite one another and intended to be inserted, by spinning, into slots (20) arranged in gripping handles (21) of the working container (2) to establish a bayonet-type connection, when the locking ring (53) is in the closed position, as depicted in FIGS. 1A and 1B.

The two locking tabs (57A) are advantageously arranged beneath two handles (57) of the lid (5), which come into alignment with the gripping handles (21) of the working container (2) when the locking ring (53) is in the closed position, one of the locking tabs (57A) thereby activating, in a conventional manner, a control rod of the lid safety mechanism when the locking ring (53) is in the closed position.

As can be seen in FIGS. 3 through 6, the body (52) of the lid comprises a circular bottom wall (52A) that closes the lower end of the cylindrical wall (54) and that supports an interior skirt (58) extending beneath the lid (5). The interior skirt (58) has a divergent shape and comprises a peripheral groove receiving an airtight gasket (7) with a lip that comes to rest on one upper edge of the working container (2) when the lid (5) closes the working container (2).

The body (52) of the lid also comprises a waste prevention ring (59) which rises from the lower surface of the bottom wall (52A) and has a smaller diameter than the diameter of the interior skirt (58), the diameter of the waste prevention ring (59) being adapted so that the latter comes to the edge of the disc (4), as illustrated in FIG. 3, when the lid (5) closes the working container (2). Such a waste prevention ring (59) can prevent pieces of vegetables not yet processed by the disc (4) and located between the disc (4) and the bottom wall (52A) of the lid, from being able to escape past the periphery of the disc (4).

Figure 5:
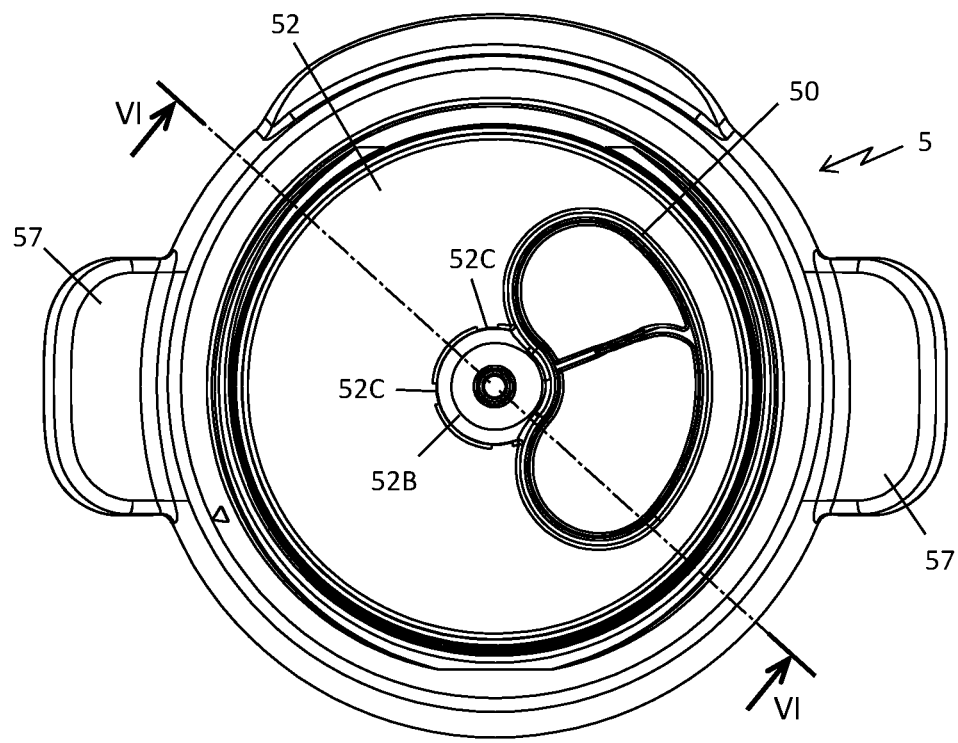
FIG. 5 is a view from above of the lid in FIG. 4.
Figure 6:
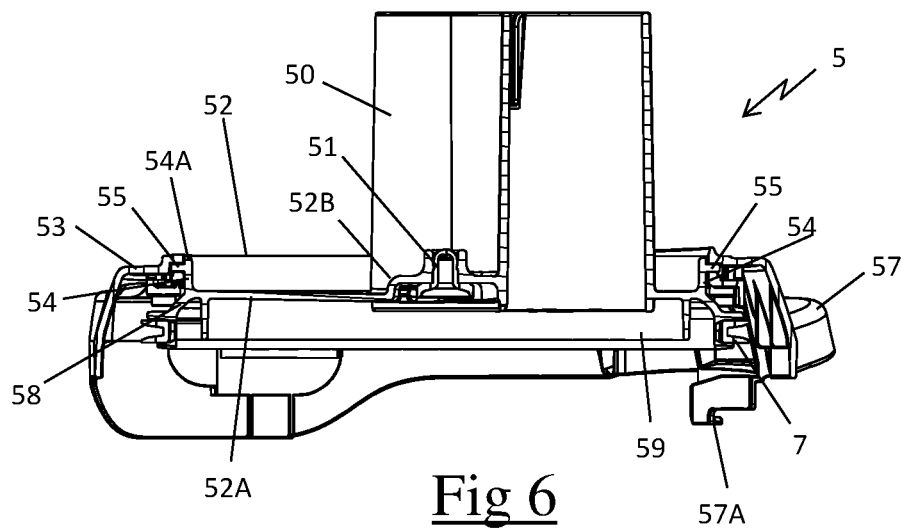
FIG. 6 is a cross-section view along Line VI-VI in FIG. 5.
Figure 7:
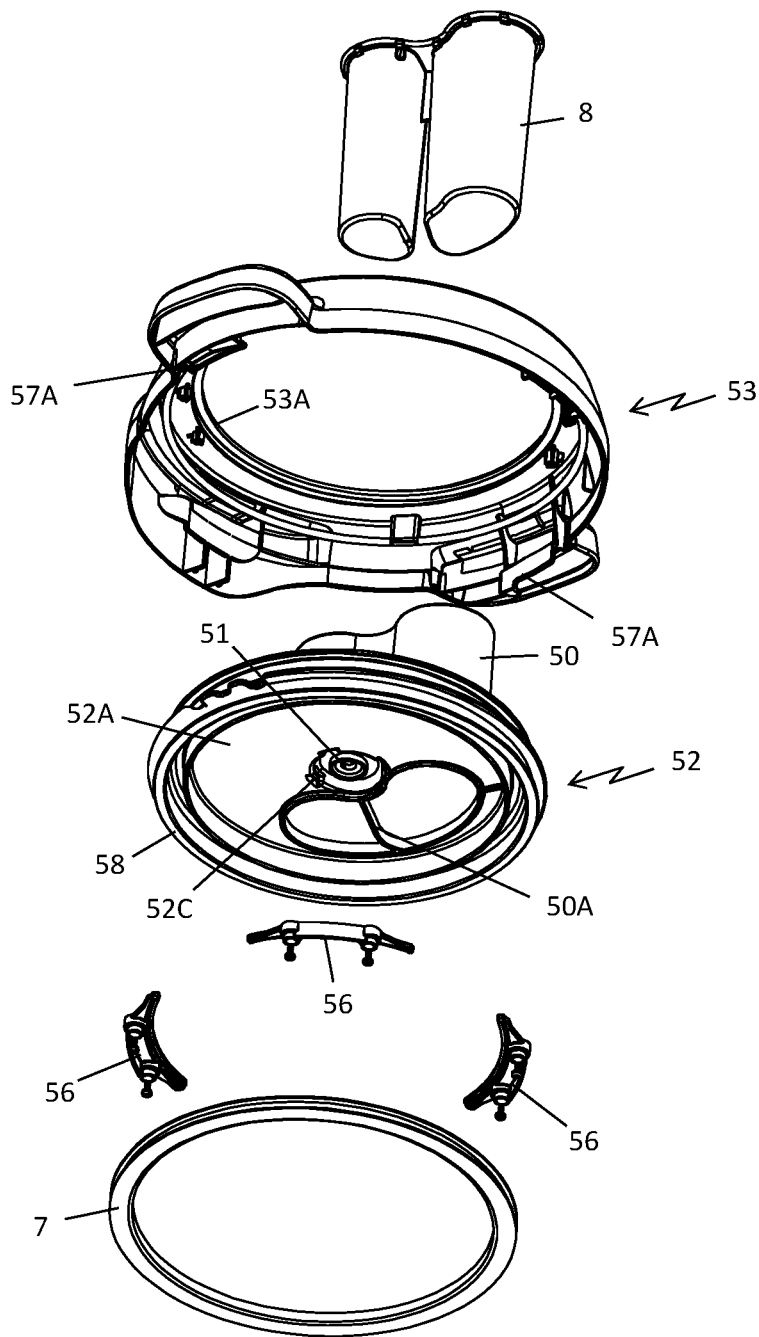
FIG. 7 is an exploded perspective view of the lid in FIG. 6.

As shown in FIGS. 5 through 7, the tube (50) for adding food in the lid (5) is built into the body (52) and protrudes vertically on the upper surface of the bottom wall (52A), the bottom wall (52A) and the cylindrical wall (54) of the body (52) defining a cavity at the base of the tube (50) in which any liquid running to the edge of the tube (50) can be collected.

As better seen in FIG. 6, the tube (50) is in an off-center position on the lid (5) and has a bean-shaped external transverse cross-section extending around a dome (52B) arranged in the center of the lid (5), the dome (52B) supporting the guide bearing (51) and comprising lateral openings (52C) passing from one side to the other, making it possible to return the liquid collected in the cavity to the working container (2).

Advantageously, the lid (5) comprises, in a conventional manner, a separation wall (50A) extending vertically in the tube (50) to divide the tube (50) into two separate passageway cross-section zones: a first, larger passageway cross-section zone designed to receive larger-sized vegetables, and a second, smaller passageway cross-section zone designed to receive smaller-sized vegetables.

The lid (5) also comprises a tamper (8) that is inserted into the tube (50) and has a shape that is complementary to the tube (50) with two lobes separated from one another by a gap allowing for the insertion of the separation wall (50A).

The operation of the appliance will now be described.

When the user wishes to slice vegetables using the appliance, he inserts the drive hub (6) onto the driver (22)

protruding from the bottom of the working container (2), and then he positions the disc (4) on the upper end of the drive hub (6). He then takes the lid (5) and brings it over the working container (2), orienting the tube (50) in the position he finds most suitable, while ensuring that the two handles (57) of the lid (5) are clearly angularly offset from the gripping handles (21) of the working container (2). The user can then place the lid (5) on the working container (2) so that the metal axis (60) of the drive hub (6) is inserted into the guide bearing (51), the latter advantageously having a lower end equipped with a convergent wall to ensure the automatic centering of the metal axis (60) inside the guide bearing (51).

The lid (5) then rests on the working container (2) with the gasket (7) in contact with the upper edge of the working container (2) and the tube (50) oriented however the user desires, as this orientation can always be modified by lifting the lid (5) slightly to release the pressure on the gasket (7) and by turning only the body (52) comprising the tube (50).

The user can then lock the lid (5) into the closed position by grasping the two handles (57) of the lid (5) and turning the locking ring (53) in the trigonometric direction illustrated by arrows in FIG. 2, so as to bring the two handles (57) of the lid (5) into alignment with the gripping handles (21) of the working container (2), the central body (52) of the lid (5) remaining immobile during this rotation, due to the adhesion established between the airtight gasket (7) and the upper edge of the working container (2).

The rotation of the locking ring (53) causes the lid (5) to lock onto the working container (2), through the insertion of locking tabs (57A) into the slots (20) of the gripping handles (21), which is accompanied by the exertion of pressure on the gasket (7) ensuring an airtight seal between the lid (5) and the working container (2), the insertion of one of the locking tabs (57A) into one of the slots (20) simultaneously initiating the activation of the lid safety mechanism.

The motor (3) of the appliance can then be started by pressing a button arranged on the control panel (10), and the vegetables to be processed can be added through either one of the zones of the tube (50), the vegetables sliced or grated by the disc (4) then falling to the bottom of the working container (2).

While the motor (3) is operating and/or after it stops, the hot plate (11) of the working container (2) can be started to cook the food inside the working container (2), the presence of the airtight gasket (7) on the lid (5) thus preventing any steam from escaping through the junction between the upper edge of the working container (2) and the lid (5).

Moreover, any liquid that might leak through the tube (50) while the tool is spinning and/or during cooking is collected in the cavity, and then recycled to the interior of the container through openings (52C) arranged in the lid (5).

When the user wishes to access the contents of the working container (2), he must simply turn the locking ring (53) in the opposite direction, to bring it into an open position in which the locking tabs (57A) are disengaged from the slots (20) of the gripping handles (21), and then lift the lid (5) by the handles (57).

The appliance thus created therefore comprises a lid (5) that achieves great usage ergonomics, as the lid (5) offers the advantage of being equipped with an off-center tube (50), the orientation of which can be easily adjusted by the user prior to locking the lid (5) and which can be easily locked onto the working container (2) by simply rotating the locking ring (53). In particular, such an appliance offers the advantage of achieving equal usage ergonomics whether the use is right-handed or left-handed, as the tube (50) can either be brought to the left side or the right side of the appliance, as depicted in FIGS. 1A and 1B, respectively.

In addition, such a lid (5) also offers the advantage of obtaining a good airtight seal at the junction between the lid (5) and the working container (2), while requiring only a slight effort on the user's part to lock the lid (5).

Finally, the appliance equipped with such a lid (5) can be used to chop, grate or slice food, but also to cook it without requiring the ingredients to be transferred from one container to another, as these operations can be performed simultaneously or in succession.

Figure 8:
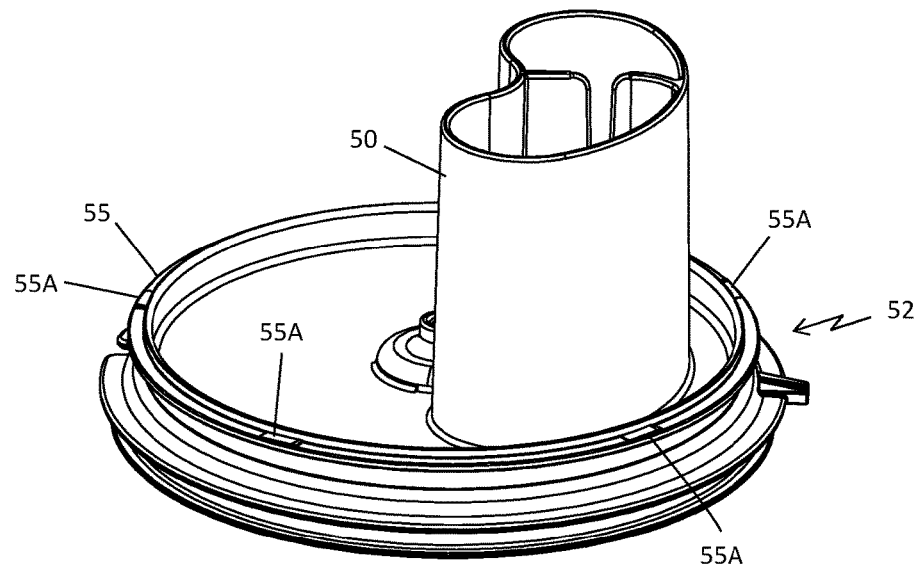
FIG. 8 is a perspective view of the body of the lid in one variation of implementing the invention.
Figure 9:
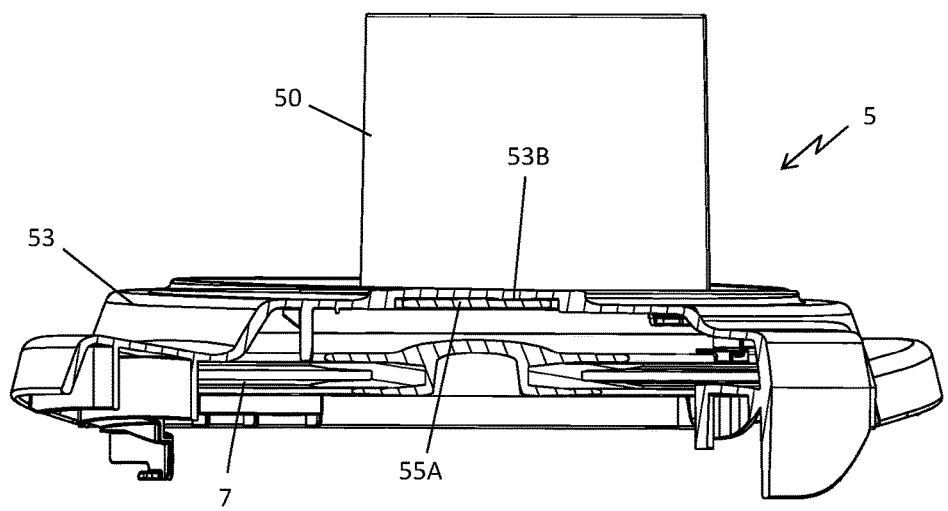
FIG. 9 is a cross-section view of the lid in the variation of implementation in FIG. 8.

In one variation of implementation depicted in FIGS. 8 and 9, the rotation of the body (52) of the lid with respect to the locking ring (53) will be advantageously prevented in the direction in which the tool (4) spins, by a stopping mechanism. This stopping mechanism advantageously consists of several notches (55A) distributed regularly over the upper surface of the annular radial rib (55), which cooperate with notches (53B) arranged on the lower surface of the locking ring (53).

In the example depicted, the notches (55A and 53B) comprise, on one side, a sliding surface that extends roughly parallel to the plane of closure of the lid (5) and, on the other side, a stopping surface that extends perpendicular to the plane of closure of the lid (5), such that the stopping surfaces come up against one another when the body (52) of the lid is rotated in the direction in which the tool (4) is spinning, and such that the sliding surfaces pass freely over one another when the body (52) of the lid is moved in the direction opposite the spinning of the tool (4).

Such a characteristic makes it possible, while the appliance is operating, to prevent the body (52) of the lid (5) from being spun by the spinning flow of food caused by the spinning of the tool (4).

Of course, the invention is in no way limited to the method of implementation described and depicted, which has been provided only as an example. Modifications may be made, particularly with regard to the makeup of the various components or by substituting technical equivalents, while nevertheless remaining within the scope of protection of the invention.

Thus, in one variation of implementation not depicted, the tube for adding food may have a circular passageway cross-section.

Thus, in one variation of implementation not depicted, the airtight seal of the lid may be achieved using an O-ring seal.

Thus, in yet another variation of implementation not depicted, the appliance may comprise a scraper, attached to the drive hub supporting the disc, for scraping the interior wall of the working container.

The invention claimed is:

1. A Cooking appliance comprising a lid that closes, in a removable manner, a working container receiving a tool spun by a motor, the lid having a body equipped with a tube for adding food, the tube arranged in an off-center manner on the lid, the lid comprising a locking ring that can move by spinning on said body, and the locking ring can be in a closed position in which the locking ring holds the lid in a closed position on the working container, or an open position in which the lid can be lifted off of the working container, wherein the appliance comprises a drive hub with a lower end that mates, in a removable manner, with a driver arranged in the bottom of the working container and an upper end supporting a vegetable slicing disc, the body of the lid comprising a waste-prevention ring that comes to an edge of the vegetable slicing disc when the lid is in the closed position, wherein the waste prevention ring rises from a lower surface of a bottom wall of the lid and has a smaller diameter than a diameter of an interior skirt extending beneath an upper surface of the lid, and wherein the interior skirt comprises a peripheral groove receiving an airtight gasket with a lip that comes to rest on one upper edge of the working container when the lid closes the working container.

2. The Cooking appliance described in claim 1, wherein the airtight gasket presses against the working container when the lid is in the closed position.

3. The Cooking appliance described in claim 1, wherein the tube rises from a bottom of a cavity arranged on the upper surface of the lid.

4. The Cooking appliance described in claim 3, wherein the cavity has openings leading to the lower surface of the bottom wall of the lid.

5. The Cooking appliance described in claim 1, further comprising a heating mechanism that can heat contents the working container.

6. The Cooking appliance described in claim 1, wherein the lid has two handles arranged symmetrically on the locking ring.

7. The Cooking appliance described in claim 6, wherein the two handles protrude radially from an edge of the lid.

8. The Cooking appliance described in claim 1, wherein the body of the lid comprises an annular radial rib that is sandwiched between one annular edge of the locking ring and attachment flanges attached to the locking ring.

9. The Cooking appliance described in claim 1, wherein the locking ring comprises locking components, the locking components consisting of tabs carried by the locking ring, creating a bayonet-type connection with the working container.

10. The Cooking appliance described in claim 1, wherein the lid comprises a mechanism to prevent the body of the lid from rotating with respect to the locking ring in a direction in which the tool is spinning when the lid is locked on to the working container.

11. The Cooking appliance described in claim 2, wherein the airtight gasket is removable.

* * * * *

UNITED STATES PATENT AND TRADEMARK OFFICE
CERTIFICATE OF CORRECTION

PATENT NO.         : 10,478,013 B2
APPLICATION NO.    : 15/086165
DATED              : November 19, 2019
INVENTOR(S)        : Jean-Louis Deshayes et al.

It is certified that error appears in the above-identified patent and that said Letters Patent is hereby corrected as shown below:

In the Claims

Column 6, Line 52, Claim 1, delete "Cooking" and insert -- cooking --

Column 6, Line 52, Claim 1, delete "comprising" and insert -- comprising: --

Column 7, Line 9, Claim 2, delete "Cooking" and insert -- cooking --

Column 7, Line 13, Claim 3, delete "Cooking" and insert -- cooking --

Column 7, Line 16, Claim 4, delete "Cooking" and insert -- cooking --

Column 7, Line 19, Claim 5, delete "Cooking" and insert -- cooking --

Column 7, Line 20, Claim 5, after "contents" insert -- placed in --

Column 8, Line 1, Claim 6, delete "Cooking" and insert -- cooking --

Column 8, Line 4, Claim 7, delete "Cooking" and insert -- cooking --

Column 8, Line 6, Claim 8, delete "Cooking" and insert -- cooking --

Column 8, Line 10, Claim 9, delete "Cooking" and insert -- cooking --

Column 8, Line 14, Claim 10, delete "Cooking" and insert -- cooking --

Column 8, Line 19, Claim 11, delete "Cooking" and insert -- cooking --

Signed and Sealed this
Seventeenth Day of March, 2020

Andrei Iancu
*Director of the United States Patent and Trademark Office*

Page 1 of 1